United States Patent
Adams et al.

(10) Patent No.: US 10,160,134 B2
(45) Date of Patent: Dec. 25, 2018

(54) METHOD OF CUTTING AND CUTTING APPARATUS USING HIGH PRESSURE LIQUID

(71) Applicants: Dirk Adams, Tongeren (BE); Joachim Van Der Perre, Houthalen (BE); Tim Van De Laak, Valkenswaard (NL)

(72) Inventors: Dirk Adams, Tongeren (BE); Joachim Van Der Perre, Houthalen (BE); Tim Van De Laak, Valkenswaard (NL)

(73) Assignee: Key Technology, Inc., Walla Walla, WA (US)

( * ) Notice: Subject to any disclaimer, the term of this patent is extended or adjusted under 35 U.S.C. 154(b) by 77 days.

(21) Appl. No.: 15/057,939

(22) Filed: Mar. 1, 2016

(65) Prior Publication Data
US 2017/0252941 A1    Sep. 7, 2017

(51) Int. Cl.
| | | |
|---|---|---|
| *B26F 3/00* | (2006.01) | |
| *B26D 7/32* | (2006.01) | |
| *B26D 5/00* | (2006.01) | |
| *B26D 7/06* | (2006.01) | |
| *B26D 7/18* | (2006.01) | |
| *G06T 7/00* | (2017.01) | |
| *H04N 5/225* | (2006.01) | |
| *H04N 5/247* | (2006.01) | |

(52) U.S. Cl.
CPC .............. *B26F 3/004* (2013.01); *B26D 5/007* (2013.01); *B26D 7/0625* (2013.01); *B26D 7/1854* (2013.01); *B26D 7/32* (2013.01); *G06T 7/0008* (2013.01); *H04N 5/2256* (2013.01); *H04N 5/247* (2013.01); *B26D 2210/02* (2013.01); *G06T 2207/10048* (2013.01); *G06T 2207/30128* (2013.01)

(58) Field of Classification Search
CPC .......... B07C 5/363–5/368; B26F 3/004; B26D 5/007; B26D 7/32; B26D 7/0625; B26D 7/1854; B26D 2210/02; G06T 7/0008; G06T 2207/10048; G06T 2207/30128; H04N 5/247; H04N 5/2256
See application file for complete search history.

(56) References Cited

U.S. PATENT DOCUMENTS

| | | |
|---|---|---|
| 3,367,747 A | 2/1968 | Sieth et al. |
| 3,669,240 A | 6/1972 | Ross |
| 3,670,792 A | 6/1972 | Claussen |
| 3,738,258 A | 6/1973 | Goodale |
| 3,811,795 A | 5/1974 | Olsen |
| 4,157,681 A | 6/1979 | Akesson et al. |
| 4,496,515 A | 1/1985 | Ptasienski et al. |

(Continued)

OTHER PUBLICATIONS

Notification of the Transmittal of the International Search Report and the Written Opinion of the International Searching Authority, PCT/US16/68484, dated Mar. 16, 2017.

*Primary Examiner* — Stephen Choi
(74) *Attorney, Agent, or Firm* — Randall Danskin P.S.

(57) ABSTRACT

A method of application of cutting a stream of products using a source of high pressure liquid is disclosed, and where a conveyor is provided for moving a stream of product along a path of travel which is at least partially unsupported, and a liquid jet is provided all which generates a pressurized liquid stream which severs individual objects in the stream of products while the individual objects are moving in an unsupported fashion along the path of travel.

15 Claims, 4 Drawing Sheets

(56) References Cited

U.S. PATENT DOCUMENTS

| | | | |
|---|---|---|---|
| 4,520,702 A | | 6/1985 | Davis et al. |
| 4,634,881 A | | 1/1987 | Billion |
| 4,723,659 A | | 2/1988 | Billion |
| 4,751,094 A | | 6/1988 | Orr et al. |
| 4,889,241 A | * | 12/1989 | Cogan .................... B07C 5/362 |
| | | | 193/2 R |
| 5,623,868 A | | 4/1997 | McKenna |
| 6,227,087 B1 | * | 5/2001 | Thorson ................ A21C 11/10 |
| | | | 425/312 |
| 6,308,600 B1 | | 10/2001 | Dragt |
| 7,448,391 B2 | * | 11/2008 | Funke ..................... A24B 1/04 |
| | | | 131/286 |
| 7,861,648 B2 | | 1/2011 | Alvarez et al. |
| 8,549,996 B2 | | 10/2013 | Pryor et al. |
| 8,733,240 B2 | | 5/2014 | Randazzo |
| 2002/0130067 A1 | * | 9/2002 | Takai ........................ B07B 4/02 |
| | | | 209/639 |
| 2008/0173519 A1 | | 7/2008 | Ely |
| 2009/0071349 A1 | | 3/2009 | Everett et al. |
| 2010/0316773 A1 | | 12/2010 | Pierce et al. |
| 2012/0279909 A1 | * | 11/2012 | Dirix ........................ B07C 5/36 |
| | | | 209/552 |
| 2014/0220208 A1 | | 8/2014 | Kodali |
| 2014/0220209 A1 | | 8/2014 | Kodali |
| 2014/0272055 A1 | | 9/2014 | Yang et al. |

\* cited by examiner

METHOD OF CUTTING AND CUTTING APPARATUS USING HIGH PRESSURE LIQUID

TECHNICAL FIELD

This invention relates to high throughput inspection and cutting equipment for detecting defects in products and for cutting the defects from the products with a stream of high pressure liquid as the products are being processed in a high production facility.

BACKGROUND OF THE INVENTION

Many attempts have been made to devise a high throughput production system for detecting defects in elongated articles such as food products, including, but not limited to, raw potato strips and the like and for removing identified defects as the articles are being processed. Many systems have been constructed for optically inspecting articles and for separating the articles based upon whether or not the optical information indicates that the article contains a defect. Frequently the size of the defect may be quite small and the remainder of the article may be quite satisfactory. Unfortunately, processing the article to remove only the identified defect requires additional equipment and additional handling which increases the costs of processing and slows the processing speed.

Attempts have been made to process articles such as sliced potatoes utilized for "french fries" in which the articles are aligned in spaced lanes with a major axis generally parallel to a path of travel and pass beneath individual lane image capturing devices such as, but not limited to, cameras and scanners, for inspecting the french fries for defects. If defects are identified, one or more knives on a rotating wheel is projected from the wheel to cut the identified defect from the identified article. One such device is illustrated in U.S. Pat. Nos. 3,543,030 and 3,664,337 granted to Raye, et al. on Nov. 24, 1970 and May 23, 1972, respectively. However, because of limitations inherent in the equipment, it is difficult to process large volumes utilizing the equipment illustrated in such patents. One important limitation is the difficulty of positioning and processing the potato strips in very close proximity to each other and for moving the articles past the electrical optical inspection station and the wheel cutting station at high speeds.

Along a similar line, U.S. Pat. No. 4,656,904 granted Sep. 19, 1978 to K. Vomfett, describes an apparatus for moving raw potato sticks past sensing equipment for determining whether the sticks have defects, and then past a cutting system having a pair of vertically moveable cutters that move down through slots defined in a trough conveyor for cutting out the defect. The defective segment is removed below the trough. Such a system is quite slow and incapable of handling high volume production. As the knife blades pass down through the product, the product remains substantially stationary and cannot regain its forward movement until the knives are retracted.

The use of cutting knives, whether the knives are ejected using centrifugal force from a spinning wheel, or moved by any other means has occasionally been problematic in high throughput operations, especially in the food industry. Further, the repeated extension and retraction of such knives has led to mechanical wear, and occasional "sticking" of the knives in one position, or the other, which can stop the throughput process, allows defective materials to pass therethrough; or further can result in the damage or complete destruction of the knife.

One possible advancement in high throughput food processing operations has been the utilization of water jet cutters which have tended to resolve the earlier mentioned issue of "sticking" cutting blades and also allowed for more rapid processing of food products.

For example, U.S. Pat. No. 5,623,868 to McKenna, issued Apr. 29, 1997 and discloses a carrot processing machine that uses a high pressure water jet cutter to cut off the tops and tails of carrots and which also segments the carrots into shorter lengths while the carrots are disposed within a series of pockets defined in a conveyor. Another prior art example is U.S. Pat. No. 8,549,996 to Pryor, et al. issued Oct. 8, 2013, and that uses a high pressure water jet cutter to "top" and "tail" lettuce heads, as the heads of lettuce are disposed on a feed conveyor. A still further prior art example is U.S. 2014/0272055 to Yang, et al., published Sep. 18, 2014, and which discloses an automated fruit and vegetable calyx or stem removal machine that uses a high pressure water jet cutter to remove the calyx of strawberries that are oriented on a conveyor belt.

One universal characteristic of the known methods for high-throughput processing of food products is that the individual pieces of product are supported from below during the cutting process so that the knives, or high pressure stream of water may sever the pieces as desired, and the support, under the piece or object being severed, provides positional stability during the severing process. Providing a support of the individual item to be severed, during the severing process is a limiting factor in the processing of these products or objects, because the amount of space (side-to-side and end-to-end) is limited by the conveyor size, and also by the conveyor speed. Further, the support of the items or objects upon a conveyor makes it impossible to optically inspect the individual items from all sides, such that defects that are positioned immediately adjacent to the underlying and supporting conveyor cannot be imaged for sorting purposes. The inability to image all sides and surfaces of the individual items is a limitation that allows defective products to pass through the inspection process.

The invention herein is an improvement over known inspection, sorting and cutting apparatus by providing an invention that releases the individual items into a predicted unsupported trajectory; that inspects individual items from all sides and surfaces during the predicted unsupported trajectory; and further that cuts/severs identified individual items by making one or more simultaneous cuts per item, to remove identified defects therein during the predicted, unsupported trajectory of the individual pieces; and by using a high pressure liquid to make the cuts.

One of the principal objects of the instant invention is to provide a high volume, accurate inspection and cutting device for detecting color or shape variance defects in the articles such as potato sticks or potato strips, and then removing the defects while the sticks or articles are moving in a predicted unsupported trajectory. A still further object of this invention is to provide a high volume inspection and cutting apparatus for removing defects from articles with equipment that is quite inexpensive relative to its processing capacity.

These and other objects and advantages of this invention will become apparent upon reading the following detailed description of a preferred embodiment.

SUMMARY OF THE INVENTION

A first aspect of the present invention relates to a cutting apparatus using high pressure liquid which includes a frame supporting a material handling system in spaced relation relative to an underlying supporting surface, and wherein the material handling system may be a conveyor having a proximal end and an opposing distal end, and wherein the conveyor transports a stream of discrete, individual articles of interest at a predetermined speed along a first supported path of travel to the distal end of the conveyor, and wherein the stream of articles of interest includes a plurality of discrete individual articles of interest each having portions that are desirable, and some of the discrete individual articles of interest having portions that are not desirable, and wherein each individual article of interest has a major axis and a minor axis, and the individual articles of interest are oriented with the major axis generally transverse relative to the first supported path of travel, and wherein the conveyor releases the individual articles of interest into a second predicted, unsupported trajectory from the distal end of the conveyor. An inspection zone is located proximate to the distal end of the conveyor and wherein the stream of articles of interest passes through the inspection zone for inspection by an imaging device which inspects each discrete individual article of interest comprising the stream of articles of interest passing through the inspection zone; and an illumination device for illuminating the stream of articles of interest passing through the inspection zone while the stream of articles of interest are being inspected by the imaging device. A high pressure liquid manifold is coupled to a source of high pressure liquid, and wherein the high pressure liquid manifold has a plurality of individual liquid jet nozzles which are positioned downstream of the inspection zone, and wherein the high pressure liquid manifold is operatively coupled with a controller which activates and deactivates the individual liquid jet nozzles so as to release individual jet streams of high pressure liquid which sever identified discrete individual articles of interest forming the stream of articles having desirable portions, and undesirable portions, during the second, predicted unsupported trajectory. An ejector assembly is positioned downstream of the inspection zone and has a plurality of individual high pressure air nozzles which are coupled with a source of high pressure air, and wherein the ejector assembly is operatively coupled with the controller, which individually activates and deactivates individual high pressure air nozzles of the ejector assembly to release a burst of high pressure air which removes identified individual articles of interest from the stream of articles of interest that have been identified as having undesirable portions and predetermined undesirable characteristics during the second predicted unsupported trajectory. The controller is further operatively and controllably coupled to the imaging device, the illumination device, the ejector assembly and the high pressure liquid manifold, and a user interface which is controllably coupled with the controller.

Another aspect of the present invention relates to a method of cutting with a high pressure liquid which includes providing a moving stream of discrete individual articles of interest, each discrete article of interest having a major axis and a minor axis. Providing a material handling system which may be a conveyor having a proximal end and a distal end which transports the stream of discrete individual articles of interest at a predetermined speed along a first supported path of travel to the distal end of the conveyor, and wherein the discrete individual articles of interest have desirable portions and some may have undesirable portions or predetermined undesirable characteristics, and the discrete individual articles of interest are each oriented with the major axis substantially transverse to the first supported path of travel, and the discrete individual articles of interest are each released from the distal end of the conveyor into a second predicted unsupported trajectory. The method includes another step of providing an inspection zone proximate to the distal end of the conveyor wherein the stream of discrete individual articles of interest pass through the inspection zone for inspection by an imaging device while being illuminated by an illumination device. The method includes another step of providing a controller which operatively communicates with the imaging device which receives imaging information from the imaging device and wherein the controller determines a present position and predicted future positions of each discrete individual article of interest having undesirable portions and undesirable characteristics, and for determining the present position and the predicted future positions of the undesirable portions during the second predicted unsupported trajectory. The method includes another step of providing a high pressure liquid manifold coupled with a source of high pressure liquid and which is located downstream of the inspection zone, and wherein the high pressure liquid manifold has a plurality of individual liquid jet nozzles, and wherein the high pressure liquid manifold and the individual liquid jet nozzles are operatively coupled with the controller, and the controller activates and deactivates the individual liquid jet nozzles to release individual jet streams of liquid having a pressure sufficient to sever identified discrete individual articles of interest forming the stream of articles of interest into separate desirable portions and undesirable portions during the second predicted unsupported trajectory. The method includes another step of providing an ejector assembly coupled with a source of high pressure air, and wherein the ejector assembly is located downstream of the inspection zone and has a plurality of individual air nozzles, and wherein the ejector assembly is operatively coupled with the controller, and wherein the controller individually activates and de-activates the individual high pressure air nozzles of the ejector assembly which release bursts of high pressure air which removes the previously identified undesirable discrete individual articles of interest from the stream of articles, and severed undesirable portions of the discrete individual articles of interest during the second predicted unsupported trajectory.

These and other aspects and advantages of this invention will become apparent and will be described in greater detail hereinafter.

DETAILED DESCRIPTION OF THE PREFERRED EMBODIMENTS

Figure 1:
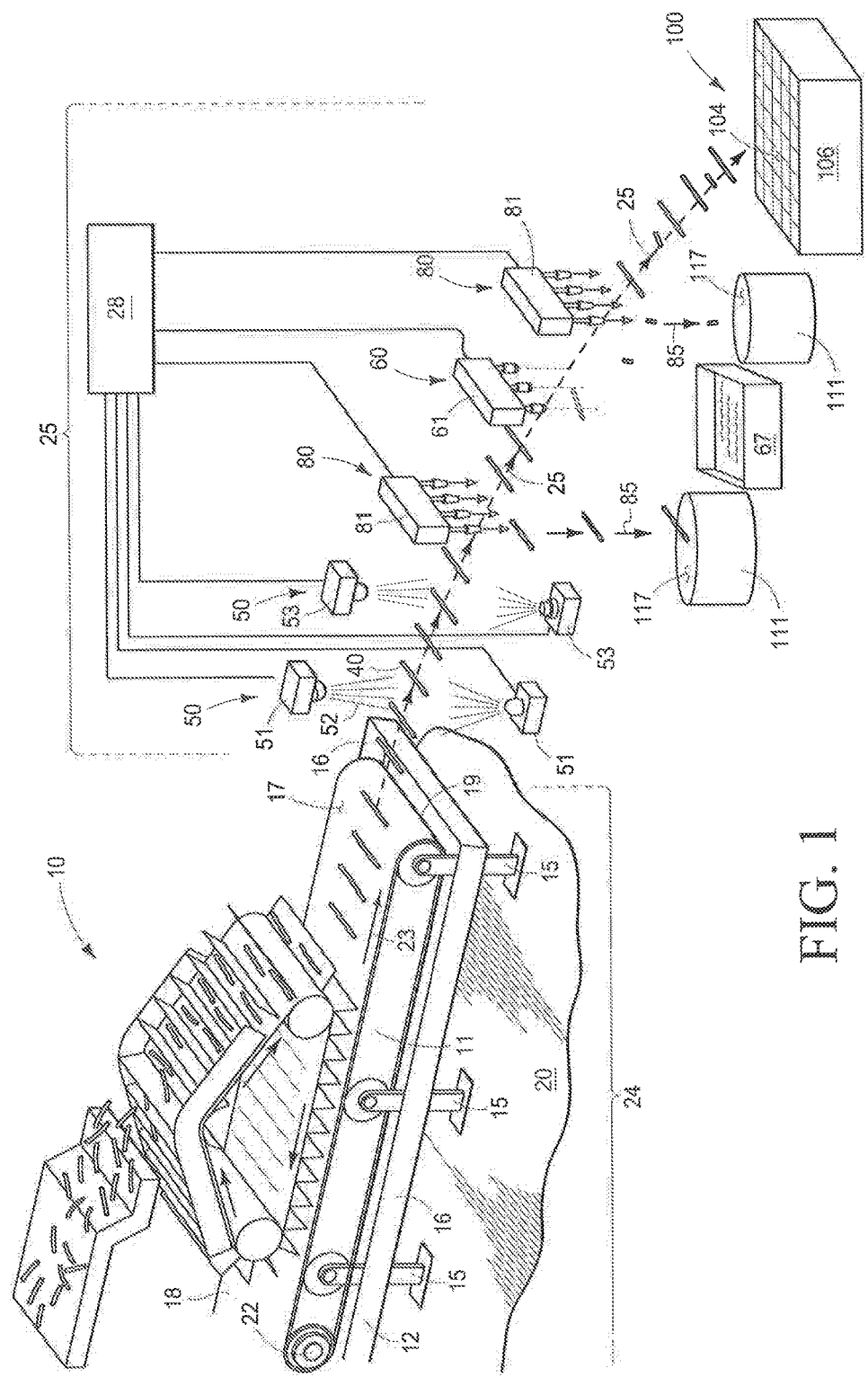
FIG. 1 is an isometric top, side and end view of the instant cutting apparatus showing the stream of discrete individual pieces of produce being aligned in a first supported path of travel and thereafter being released into a second predicted unsupported trajectory passing through an inspection zone, past an ejector assembly and past a high pressure liquid manifold and past an optional second ejector assembly with a portion of the stream of discrete individual pieces of produce being collected in a first collection container and a second portion of the stream of discrete individual pieces of produce being collected in a second collection container.
Figure 2:
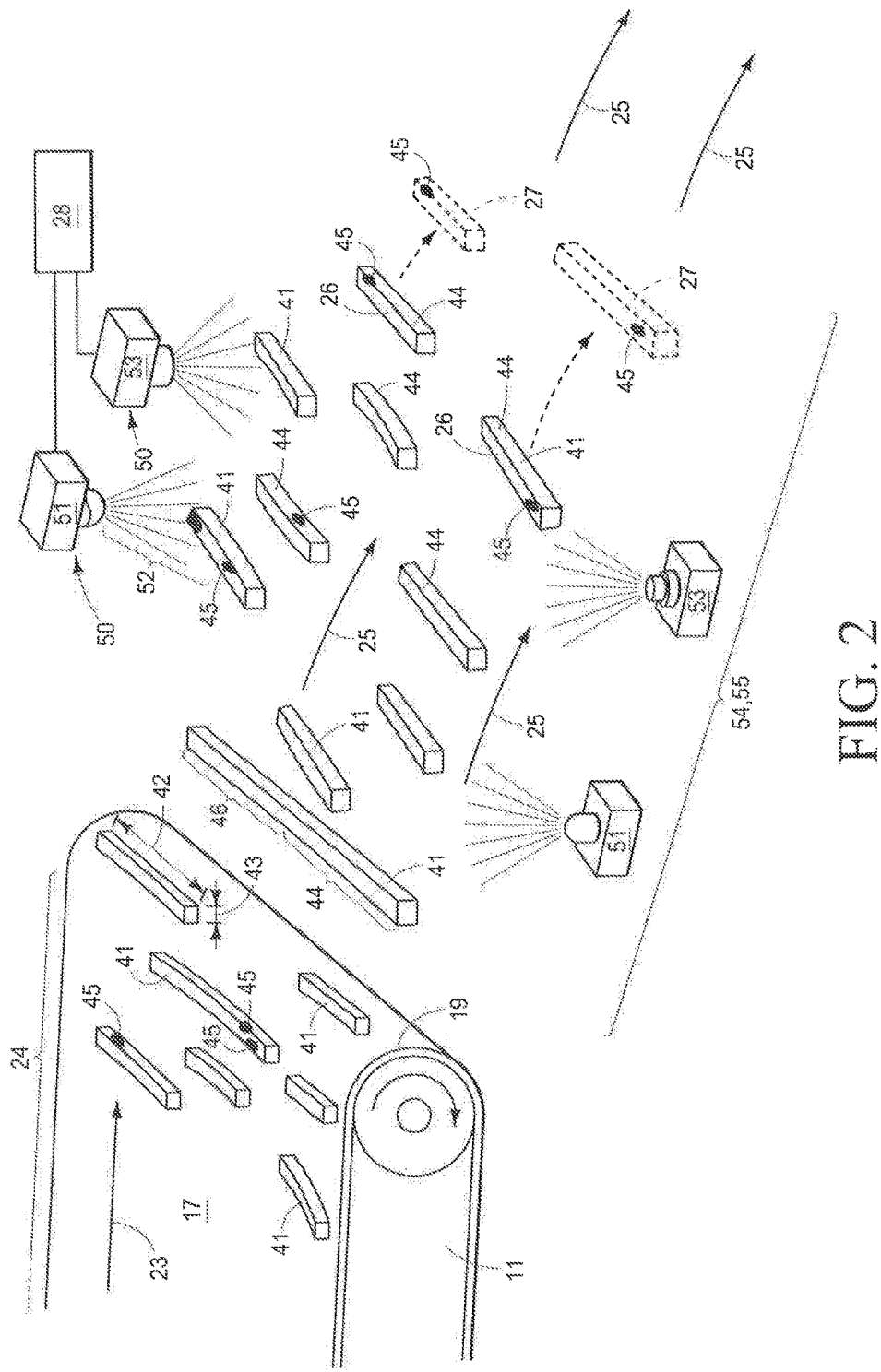
FIG. 2 is an enlarged isometric top and side view of a portion of FIG. 1 showing the stream discrete individual pieces of produce being released into the second predicted unsupported trajectory and passing through the inspection zone.
Figure 3:
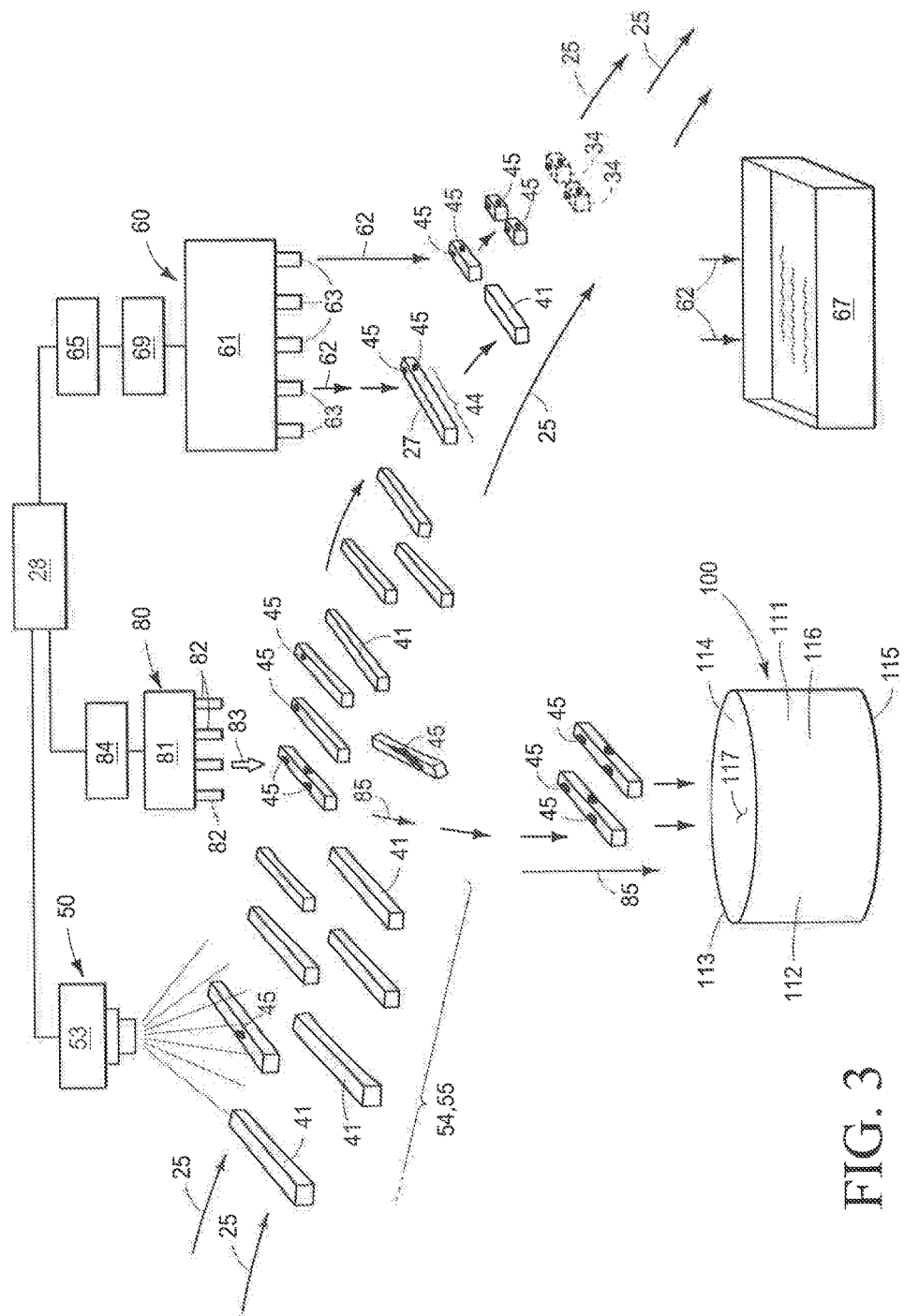
FIG. 3 is an enlarged isometric top and side view of a portion of FIG. 1 showing the stream discrete individual pieces of produce moving along the second predicted unsupported trajectory passing through the inspection zone, passing by the ejector assembly which is diverting individual pieces of produce into a removal trajectory, and showing the stream of discrete individual pieces of produce passing by the high pressure liquid manifold which is emitting jet streams of high pressure liquid to sever identified individual pieces of produce.
Figure 4:
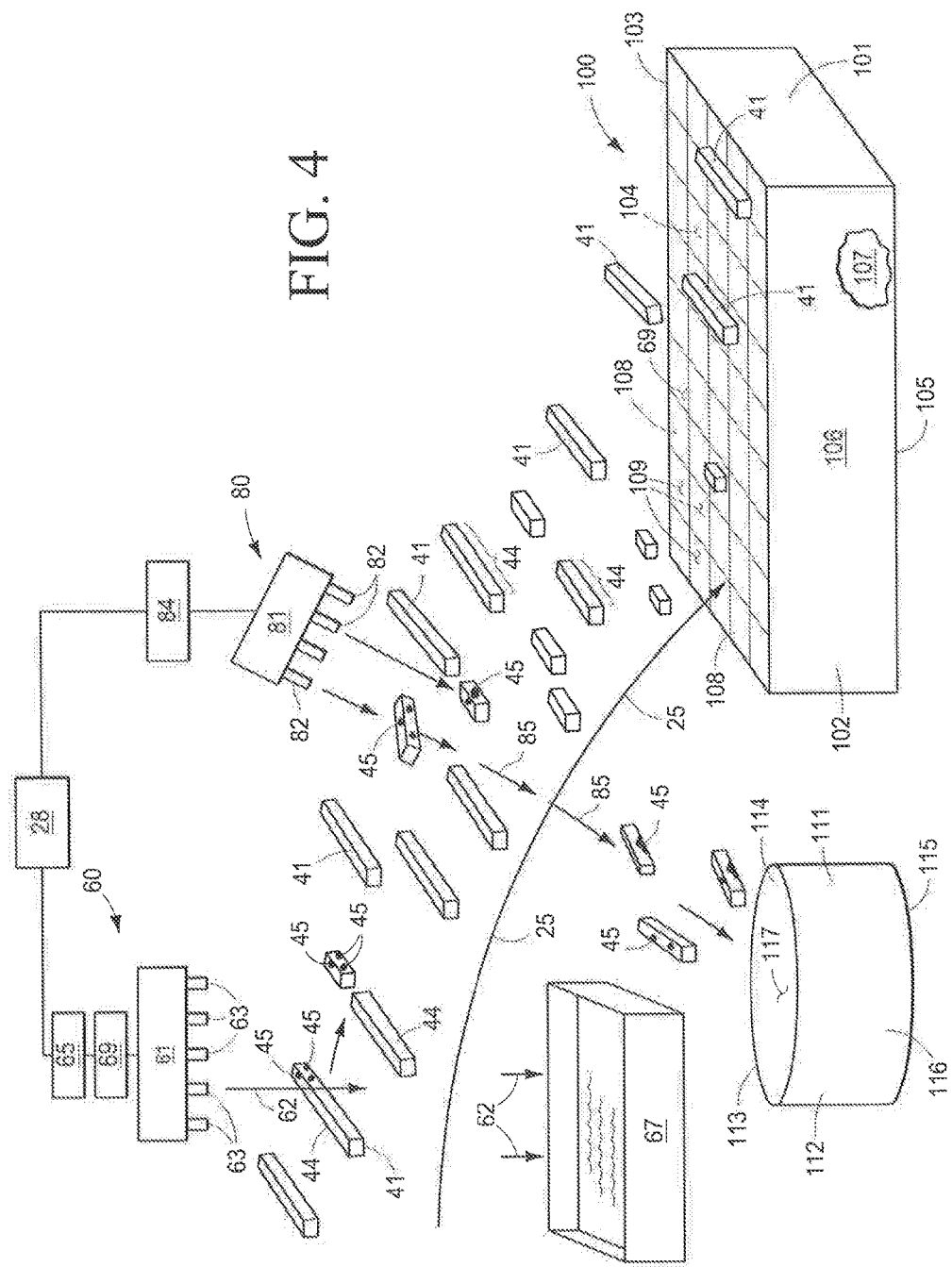
FIG. 4 is an enlarged isometric top and side view of a portion of FIG. 1 showing the stream discrete individual pieces of produce moving along the second predicted unsupported trajectory and past the high pressure liquid manifold which has severed identified individual pieces of produce into separate pieces, and past an optional second ejector assembly diverting identified severed pieces into a removal trajectory, and a collection container for receiving the articles.

This disclosure of the invention is submitted in furtherance of the constitutional purposes of the U.S. Patent Laws "to promote the progress of science and useful arts" (Article 1, Section 8).

The instant invention generally provides a material handling system 10, an inspection system 50, a cutting system 60, an ejector system 80 and a receiving system 100.

The material handling system 10 may be, but is not limited to, an elongated conveyor 11 having a top 13, a bottom 14 and a supporting frame 12 having plural spaced apart vertical legs 15. The conveyor 11 has a product transporting surface 17 that extends from a proximal end 18, to a distal end 19 and the product transporting surface 17 is oriented generally between two spaced apart sidewalls 16. The product moving surface 17, as shown in the drawings, is an endless belt, but it is contemplated that other types of conveyors, such as vibratory or excited-frame conveyors may likewise be used as the conveyor 11. It is expressly contemplated herein that a gravity chute (not shown) may likewise be utilized when the product transporting surface 17 is angulated to capitalize on the forces exerted by gravity. The product transporting surface 17 moves product at a predetermined speed 21 and is powered by a selectively energizable motor 22. It is expressly contemplated that plural selectively energizable motors 22 may function synchronously to power longer and larger conveyors 11 and product transporting surfaces 17. The product transporting surface 17 defines a path of travel 23, and more particularly a first supported path of travel 24. (See FIG. 1).

The conveyor 11 and the frame 12, as depicted in FIG. 1 rests in spaced relation relative to a supporting surface 20, here illustrated as an underlying floor. However, it should be understood that the conveyor 11, may also be suspended from an overhead supporting surface (not shown), such as a ceiling, mezzanine, or the like, in various industrial applications or environments.

A stream of articles of interest 40 are carried upon the product transporting surface 17. The stream of articles of interest 40 is comprised of a plurality of discrete individual pieces of produce 41. Each of the discrete individual pieces of produce 41, if elongated in nature may have a major axis 42, and a minor axis 43. Further, various of the discrete individual pieces of produce 41 may have an undesirable portion 45, in addition to a desirable portion 44. The undesirable portion 45 may be a predetermined defect, such as, but not limited to, a discoloration, a bruise, rot, or perhaps remaining skin or peel. The undesirable characteristic 46 may also be, without limitation, an undesirable length/width/thickness or other measurable quality. The stream of articles of interest 40 are deposited upon the product moving surface 17 by the material handling system 10 (See FIG. 1) and are oriented so that the major axis 42 of each discrete individual piece of produce 41 is oriented generally transversely to the path of travel 23 of the product transporting surface 17. In general, the plurality of discrete individual pieces of produce 41 are deposited upon the product transporting surface 17 at the proximal end of 18, of the conveyor 11. In some applications, the discrete individual pieces of produce 41 are deposited upon the product transporting surface 17 in the desired orientation (with a major axis 42 transverse to the path of travel 23) or, in other applications the orientation of the discrete individual pieces of produce 41 may be forcibly manipulated while the discrete individual pieces of produce 41 are moving on the product transporting surface 17, such as with, but not limited to, high-pressure air, or gravity, so that the discrete individual pieces of produce 41 are correctly oriented prior to the discrete individual pieces of produce 41 reaching the distal end 19 of the conveyor 11, and being released into a second, predicted, unsupported trajectory 25.

As noted previously, the product transporting surface 17 of the conveyor 11 moves at a predetermined speed which is preferably between approximately 0.5 meters per second and approximately 6.0 meters per second.

The inspection system 50 is positioned proximate or juxtaposed relative to the distal end 19 of the conveyor 11. The inspection system 50 comprises an illumination device 51 that emits electromagnetic radiation 52 of a selected predetermined wavelength so as to effectively be reflected, refracted and/or absorbed by the discrete individual pieces of produce 41 so as to allow for the desired imaging of the individual pieces and an image capturing device 53, such as, but not limited to, a camera or a scanner is provided to effect the desired imaging. The illumination device 51 and the image capturing device 53 are aligned and focused upon an inspection zone 54 that is coincident with an illumination zone 55 so that the discrete individual pieces of produce 41 simultaneously pass through the inspection zone 54, and the illumination zone 55, and where the discrete individual pieces of produce 41 are illuminated by the illumination device 51, and imaged by the image capturing device 53 for detecting the presence of undesirable portions 45 and predetermined undesirable characteristics 46. The inspection zone 54 and illumination zone 55 may be on the product transporting surface 17, and may also be spaced apart from the product transporting surface 17 so that the discrete individual pieces of produce 41 may be illuminated and imaged during the second predicted unsupported trajectory 25 which begins when the discrete individual pieces of produce 41 are released from the distal end 19 of the conveyor's 11 product transporting surface 17. It is expressly contemplated the illumination of the individual pieces of produce 41 may be continuous over time, or pulsed over time, or both continuous and pulsed over time, using for example different wavelengths of electromagnetic radiation to inspect for predetermined characteristics.

The second, predicted, unsupported trajectory 25 may be a generally arcuate path (See FIGS. 1-4) having a gravitationally influenced component (not shown), and a horizontal component (not shown). It is also contemplated that the second, predicted, unsupported trajectory 25 may be substantially generally vertical (not shown). The second predicted unsupported trajectory 25 allows the discrete individual pieces of produce 41 to be illuminated and imaged from all sides simultaneously. This avoids the aforementioned drawback of discrete individual pieces of produce 41 having undesirable portions 45, and undesirable characteristics 46 being hidden from the inspection system 50 by being placed/positioned immediately adjacent to underlying, supporting product transporting surface 17.

The path of travel 23, the predetermined speed of the discrete individual pieces of produce 41 on the product transporting surface 17, and the inspection system 50 allows a controller 28 to determine a present position 26 for each of the discrete individual pieces of produce 41, and also allows the controller 28 to determine a predicted future position 27 of each of the discrete individual pieces of produce 41 along the entire course of the second, predicted, unsupported trajectory 25. It is expressly contemplated herein that the image capturing device 53, in communication with the controller 28, may be used to calculate the speed of the discrete individual pieces of produce 41 moving along the second unsupported trajectory 25 by determining position relative to time.

The cutting system 60 is located in spaced relation relative to the distal end 19 of the conveyor 11, and adjacent to the second, predicted, unsupported trajectory 25. The cutting system 60 comprises a high pressure liquid manifold 61 which is coupled with a source of high pressure liquid 69. The high pressure liquid manifold 61 has a plurality of spacedly arrayed individual liquid jet nozzles 63 that are individually responsive to a signal from controller 28 so as to release a stream of high pressure liquid 62 that has a pressure sufficient to sever identified discrete individual pieces of produce 41 passing through the stream 62. The controller 28, which has determined the predicted future position 27 (FIG. 2) of each discrete individual piece of produce 41 having an undesirable portion 45 or a predetermined undesirable characteristic 46, uses the predicted future position 27 information to determine when to send a signal to the high pressure liquid manifold 61 to actuate the release of a stream of high pressure liquid 62 so as to cause the desired severing/cutting while the identified discrete individual pieces of produce 41 are traveling along the second predicted unsupported trajectory 25. The streams of high pressure liquid 62 emitted from the individual liquid jet nozzles 63, after passing through the second predicted unsupported trajectory 25 are collected in a fluid collection body 67 that is spaced apart from the high pressure liquid manifold 61, and on an opposing side portion of the second predicted unsupported trajectory 25. Food grade additives and other comestible substances, such as but not limited to, lubricants, (not shown) may be added to the liquid for purposes such as to enhance the cutting, improve the durability of the jet nozzles 63, and to improve the quality of the severed products.

It has been determined that the orientation of the discrete individual pieces of produce 41, which have the major axis 42 which is generally transverse to the path of travel 23 over the course of the second predicted unsupported trajectory 25 tends to stabilize the individual pieces of produce 41 as they are severed by the stream of high pressure liquid 62. The stabilizing of the pieces 41 may allow the controller 28 to calculate a second predicted future position 34 (FIG. 3) of each portion of each severed discrete individual piece of produce 41 along the predicted unsupported trajectory 25 subsequent to the severing/cutting to permit sorting subsequent to cutting.

The ejector system 80 comprises an ejector assembly 81 having a plurality of individual high pressure air nozzles 82 communicating with a source of high pressure air 84. The ejector assembly 81 is positioned downstream of the distal end 19 of the conveyor 11 product transporting surface 17 and may be positioned either upstream of the cutting system 60, or downstream of the cutting system 60. In one form of the invention there may be two ejector systems 80, one positioned upstream of the cutting system 60 and one positioned downstream of the cutting system 60.

The ejector system 80 receives a signal from the controller 28 which is generated in response to the inspection system 50, and the image capturing device 53. The controller determines that a discrete, individual piece of produce 41 has an undesirable portion 45 or a predetermined undesirable characteristic 46. The controller 28 also calculates the predicted future position 27 of the identified discrete individual piece of produce 41 having the undesirable portion 45 or the predetermined undesirable characteristic 46 using data from the present position 26, the path of travel 23, and the predetermined speed 21. The controller 28 transmits a signal to the ejector system 80 which responsively causes the ejector assembler 81 to release a high pressure burst of air through one or more of the plurality of individual high pressure air nozzles 82. The burst of high pressure air 83 emitted by the plurality of individual high pressure air nozzles 82 is coincident with the controller's 28 identification of the predicted future position 27, and the result is the burst of high pressure air 83 forcibly impacts the identified discrete individual piece of produce 41 causing the discrete individual piece of produce 41 to be deflected out of the second, predicted, unsupported trajectory 25, and into a removal trajectory 85 for collection in the receiving system 100.

As noted previously, it is expressly contemplated herein that the ejector system 80 may be upstream of the cutting system 60 to remove identified discrete individual pieces of produce 41 from the stream of produce 40 before passing the cutting system 50, and also that the ejector system 80, or a second ejector system 80 may be positioned downstream of the cutting system 60 to remove identified severed pieces of the discrete individual pieces of produce 41 from the stream of produce 40 passing along the second predicted unsupported trajectory 25.

The receiving system 100 (FIG. 4) has a first collection container 101 having a body 102 with a top 103, and opposing bottom 105 and sidewalls 106 defining an interior volume 107 which has an entry orifice 104 proximate the top 103. A sizing screen 108 may extend over the entry orifice 104 to separate the discrete individual pieces of produce 41 by size. The sizing screen 108 may have a variety of configurations, but commonly defines a plurality of predetermined sized openings 109 that allow discrete individual pieces of produce 41 having a size/dimension smaller than the dimensions of the sized openings 109 to pass through the opening 109. Those discrete individual pieces of produce 41 having dimensions greater than, or larger than, the dimensions of the sized openings 109 do not pass through the sizing screen 108 openings 109 and may be passed for further processing or collected as desired. The receiving system 100 first collection container 101 is preferably positioned along the second, predicted, unsupported trajectory 25 opposite the product transporting surface 17. The sizing screen 108 may be stationary or may be a moving/vibrating screen to facilitate passage of the discrete individual pieces of produce 41 thereover and therethrough.

A second collection container 111 is provided and similarly has a body 112 with a top 113 and an opposing bottom 115 having sidewalls 116, and further defining an interior volume 117 with an entry orifice 114 which is proximate the top 113. The second collection container 111 is preferably positionally aligned with the ejector system 80, and on a side of the second predicted unsupported trajectory 25 opposite the ejector system 80. The entry orifice 117 is preferably oriented such that discrete individual pieces of produce 41 that are removed from the second predicted unsupported trajectory 25 by the ejector system 80, and deflected into the removal trajectory 85 pass into the entry orifice 117 for collection within the interior volume (not shown).

In the instance where the instant invention utilizes two separate ejector systems 80, one upstream from the cutting system 60, and a second ejector system 80 downstream of the cutting system 60, it may be necessary to have a third collection container which would have a configuration similar to that of the second collection container 111.

Operation

Having described the structure of our cutting apparatus using high pressure liquid, its operation may be understood and is briefly summarized at this point.

The cutting apparatus using high pressure liquid of the present invention is best illustrated by FIGS. 1-4. In its broadest aspect, the cutting apparatus using high pressure liquid includes a frame 12 for supporting a conveyor 11 in spaced relation relative to an underlying supporting surface 31, and wherein the conveyor 11 has a proximal end 18, and an opposing distal end 19, and wherein the conveyor 11 transports a stream of discrete, individual articles of interest 40 at a predetermined speed along a first supported path 24 of travel to the distal end 19 of the conveyor 11, and wherein the stream of articles of interest 40 includes a plurality of discrete individual articles of interest 41 each having portions that are desirable 44, and some of the discrete individual articles of interest 41 having portions that are not desirable 45, and wherein each individual article of interest 41 has a major axis 42, and a minor axes 43, and the individual articles of interest 41 are oriented on the conveyor 11 with the major axis 42 generally transverse relative to the first supported path of travel 23, and wherein the product transporting surface 17 releases the individual articles of interest 41 into a second predicted, unsupported trajectory 25 from the distal end 19 of the conveyor 11. An inspection zone 54 is located proximate to the distal end 19 of the conveyor 11, and wherein the stream of articles of interest 40 passes through the inspection zone 54 for inspection by an image capturing device 53 which inspects each of the discrete individual articles of interest 41. An illumination device 51 illuminates each of the discrete, individual articles of interest 41 which are passing through the inspection zone 54 while the stream of articles of interest 40 are being imaged by the imaging capturing device 53. A high pressure liquid manifold 61 provided, and which is coupled to a source of high pressure liquid 65. The liquid manifold has a plurality of individual liquid jet nozzles 63 which are positioned downstream of the inspection zone 54, and wherein the high pressure liquid manifold 61, and the individual liquid jet nozzles 63 are operatively coupled with a controller 28 which activates and deactivates the individual liquid jet nozzles 63 so as to release individual jet streams of high pressure liquid 62 which intersect, strike and sever identified discrete individual articles of interest 41 forming the stream of articles 40 into desirable portions 44, and undesirable portions 45, during the second, predicted unsupported trajectory 25. An ejector system 80 is positioned downstream of the inspection zone 54, and has a plurality of individual high pressure air nozzles 82 that are coupled with a source of high pressure air 84. The ejector system 80 is operatively coupled with the controller 28, which individually activates and deactivates individual high pressure air nozzles 82 of the ejector system 80 to release a burst of high pressure air 83 which intersects, strikes and removes identified individual articles of interest 41 from the stream of articles of interest 40 that have been identified as having undesirable portions 45, or predetermined undesirable characteristics 46, during the second predicted unsupported trajectory 25 by forcing the identified discrete individual articles of interest out of the second predicted unsupported trajectory 25, and into a removal trajectory 85. The controller 28 is further operatively and controllably coupled to the conveyor 11, the image capturing device 53, the illumination device 51, the ejector system 80, the high pressure liquid manifold 61, and a user interface 29 which is controllably coupled with the controller 28.

Another aspect of the present invention relates to a method of cutting articles of interest using high pressure liquid which includes a first step of providing a moving stream of discrete individual articles of interest 41, each discrete article of interest 41 having a major axis 42 and a minor axis 43. The method includes another step of providing a conveyor 11 having a proximal end 18 and a distal end 19 which transports the stream of discrete individual articles of interest 41 on a product transporting surface 17 at a predetermined speed 21 along a first supported path of travel 24 to the distal end 19 of the conveyor 11, and wherein the discrete individual articles of interest 41 have desirable portions 44 and undesirable portions 45, and the discrete individual articles of interest 41 are each oriented on the product transporting surface 17 with the major axis 42 substantially transverse to the first supported path of travel 24, and the discrete individual articles of interest 41 are each released from the distal end 19 of the product transporting surface 17 into a second predicted unsupported trajectory 25. The method includes another step of providing an inspection zone 54 which is proximate to the distal end 19 of the product transporting surface 17, and wherein the stream of discrete individual articles of interest 41 pass through the inspection zone 54 for inspection by an image capturing device 53 while being illuminated by an illumination device 51 which emits electromagnetic radiation to facilitate the inspection by the image capturing device 53. The illumination may be continuous over time or pulsed over time, or both continuous and pulsed using, for example different wavelengths of electromagnetic radiation. The method includes another step of providing a controller 28 which operatively communicates with the conveyor 11, the illumination device 51, and the image capturing device 53, and which further receives imaging information from the image capturing device 53, and wherein the controller 28 determines the present position 26 and predicted future positons 27 of each of the discrete individual articles of interest 41 having undesirable portions 45, and undesirable characteristics 46, and which further determines the present position 26, and the predicted future positions 27 of the undesirable portions 45, 46 during the second predicted unsupported trajectory 25. The method includes another step of providing a high pressure liquid manifold 61 that is located downstream of the inspection zone 54, and is further coupled with a source of high pressure liquid 69. The high pressure liquid manifold 61 has a plurality of individual liquid jet nozzles 63, and wherein the high pressure liquid manifold 61, and the individual liquid jet nozzles 63 are operatively coupled with the controller 28, and the controller 28 activates and deactivates the individual liquid jet nozzles 63 to release individual jet streams of liquid 62 having a pressure sufficient to sever identified discrete individual articles of interest 41 forming the stream of articles of interest 40 into separate desirable portions 44 and undesirable portions 45 during the second predicted unsupported trajectory 25. The method includes another step of providing an ejector system 80 which is coupled with a source of high pressure air 84, and is further located downstream of the inspection zone 54. The ejector system 80 has a plurality of individual air nozzles 82, and wherein the ejector system 80 is operatively coupled with the controller 28. The controller 28 individually activates and de-activates the individual high pressure air nozzles 82 of the ejector system 80 which causes the release of bursts of high pressure air 83 which intersect, strike and remove the previously identified undesirable discrete individual articles of interest 41 from the stream of articles of 40, and severed undesirable portions 45 of the discrete individual articles of interest 41 during the second, predicted, unsupported trajectory 25 by forcing the identified undesirable portions 45 into a removal trajectory 85 that is not parallel to the second predicated unsupported trajectory 25.

What is claimed is:

1. A method of cutting, comprising the steps:
   releasing a stream of discrete individual articles of interest into a path of travel, the path of travel including a predicted unsupported trajectory; and
   severing the said discrete individual articles of interest by providing a liquid jet generating a stream of liquid at a pressure sufficient to sever the discrete individual articles in the stream of articles while the discrete individual articles are moving along the predicted unsupported trajectory and through the liquid jet stream.

2. A method of cutting as claimed in claim 1, and further comprising the step:
   providing a sorter assembly located downstream of the liquid jet, and sorting the severed portions according to predetermined characteristics.

3. A method of cutting as claimed in claim 1, and wherein the predicted unsupported trajectory of the discrete individual articles and the predicted unsupported trajectory of the severed articles remain predictable after the severing by the liquid jet stream.

4. A method of cutting as claimed in claim 1, and further comprising the step of:
   providing a product transporting surface having a proximal end and a distal end, and wherein the product transporting surface moves the stream of discrete individual articles of interest at a predetermined speed along a supported path of travel to the distal end of the product transporting surface where the stream of discrete individual articles of interest is released from the distal end of the product transporting surface into the predicted, unsupported trajectory.

5. A method of cutting as claimed in claim 4, and further comprising the step of:
   providing an inspection zone spaced apart from the distal end of the product transporting surface, the inspecting zone defining an area that is imaged by an image capturing device, and wherein the discrete individual articles of interest are each visually inspected by the image capturing device for detecting a predetermined characteristic or undesirable portion of the respective discrete individual articles or stream of articles.

6. A method of cutting as claimed in claim 5, and further comprising the step of:
   providing an illumination device, and illuminating the stream of discrete individual articles of interest with the illumination device as the stream of discrete individual articles of interest pass through the inspection zone.

7. A method of cutting as claimed in claim 6, and further comprising the steps of:
   providing a controller which is controllably coupled to the conveyor, the image capturing device, and the liquid jet; and
   providing a user interface which is controllable coupled with the controller.

8. A method of cutting as claimed in claim 6, and further comprising the steps of:
   providing a controller which is controllably coupled to the image capturing device, and the liquid jet; and
   providing a user interface Which is controllable coupled with the controller.

9. A method of cutting as claimed in claim 7, and further comprising the steps of:
   providing a first collection container for receiving a first portion of the stream of articles of interest after the stream of articles of interest passes by the liquid jet, and
   providing a second collection container for receiving a second portion of the stream of articles of interest.

10. A method of cutting as claimed in claim 7 and further comprising the step of:
    selectively activating and deactivating the liquid jet with the controller to release individual jet streams of liquid to strike and sever identified discrete individual articles of interest that have been identified as having a predetermined characteristic.

11. A method of cutting as claimed in claim 7, and further comprising the step of:
    providing an ejector assembly that is positioned downstream of the inspection zone and selectively activating and deactivating the ejector assembly responsive to receiving a signal from the controller indicating the presence of a discrete individual article of interest having an undesirable characteristic so as to remove the discrete individual article of interest having the undesirable characteristic from the stream of articles of interest, as the stream of articles of interest moves along the predicted unsupported trajectory.

12. A method of cutting as claimed in claim 1, and wherein the predicted unsupported trajectory is substantially arcuate.

13. A method of cutting as claimed in claim 1, and Wherein the predicted unsupported trajectory is substantially vertical.

14. A method of cutting as claimed in claim 1, and wherein the discrete individual articles of interest each have a major axis and a minor axis, and the major axis is oriented substantially transverse to the predicted unsupported trajectory.

15. A method of cutting as claimed in claim 1, and wherein the discrete individual articles of interest each have a major axis and a minor axis, and the major axis is oriented substantially angularly to the predicted unsupported trajectory.

* * * * *

UNITED STATES PATENT AND TRADEMARK OFFICE
CERTIFICATE OF CORRECTION

PATENT NO. : 10,160,134 B2
APPLICATION NO. : 15/057939
DATED : December 25, 2018
INVENTOR(S) : Dirk Adams, Joachim Van Der Perre and Tim Van De Laak Page 1 of 1

It is certified that error appears in the above-identified patent and that said Letters Patent is hereby corrected as shown below:

In the Specification

Column 1: Line 50: Delete the words "K. Vomfett" and insert the word --K. Vornfett--.

In the Claims

Column 11: Line 28: Insert the heading --Claims--.

Column 12: Line 22: Delete the word "Which" and insert the word --which--.

Column 12: Line 54: Delete the word "Wherein" and insert the word --wherein--.

Signed and Sealed this
Eighteenth Day of June, 2019

Andrei Iancu
*Director of the United States Patent and Trademark Office*